United States Patent
George (10) Patent No.: US 9,915,574 B2
(45) Date of Patent: Mar. 13, 2018

(54) METHOD AND APPARATUS FOR MEASURING A PRELOAD OF A FASTENER

(71) Applicant: The Boeing Company, Chicago, IL (US)

(72) Inventor: Nancy Jane George, Seattle, WA (US)

(73) Assignee: The Boeing Company, Chicago, IL (US)

( * ) Notice: Subject to any disclaimer, the term of this patent is extended or adjusted under 35 U.S.C. 154(b) by 725 days.

(21) Appl. No.: 14/204,311

(22) Filed: Mar. 11, 2014

(65) Prior Publication Data

US 2015/0260592 A1  Sep. 17, 2015

(51) Int. Cl.
   *G01L 5/24* (2006.01)
   *G01L 5/00* (2006.01)
   *B25B 23/142* (2006.01)

(52) U.S. Cl.
   CPC ........ *G01L 5/0019* (2013.01); *B25B 23/1425* (2013.01); *G01L 5/243* (2013.01); *G01L 5/246* (2013.01); *G01L 5/0042* (2013.01)

(58) Field of Classification Search
   CPC .......... G01L 5/0042; G01L 5/246; G01L 5/24
   USPC .................. 73/629, 761, 778, 785, 801, 802
   See application file for complete search history.

(56) References Cited

U.S. PATENT DOCUMENTS

| | | | |
|---|---|---|---|
| 3,969,960 A * | 7/1976 | Pagano | B25B 23/1425 73/761 |
| 4,294,122 A | 10/1981 | Couchman | |
| 4,625,554 A * | 12/1986 | Lanzoni | B25B 23/14 376/260 |
| 4,773,272 A | 9/1988 | Trungold | |
| 4,846,001 A | 7/1989 | Kibblewhite | |
| 5,582,080 A * | 12/1996 | Barmore | B25B 23/0035 81/177.85 |
| 5,675,087 A * | 10/1997 | MacLauchlan | G01L 1/25 73/597 |
| 7,188,549 B2 * | 3/2007 | Ohtake | B25B 21/002 81/429 |
| 7,246,980 B2 | 7/2007 | Azzalin et al. | |
| 7,412,898 B1 | 8/2008 | Smith et al. | |
| 7,441,462 B2 | 10/2008 | Kibblewhite | |
| 7,703,669 B2 | 4/2010 | Amirehteshami et al. | |
| 8,521,448 B1 | 8/2013 | Ung et al. | |

(Continued)

FOREIGN PATENT DOCUMENTS

| | | |
|---|---|---|
| EP | 2436936 | 11/2012 |
| WO | 2010028308 | 3/2010 |

*Primary Examiner* — Paul West
*Assistant Examiner* — Xin Zhong
(74) *Attorney, Agent, or Firm* — Kwan & Olynick LLP (57) ABSTRACT

A method and apparatus for measuring a preload of a fastener. The method, which may be practiced at least in part by the apparatus, includes establishing an initial value associated with an absence of the preload of the fastener and providing an adapter and a transducer rotatably coupled to the adapter. The transducer may be positioned in contact with the fastener. The transducer is caused to direct an incident ultrasonic wave to the fastener and to receive a reflected ultrasonic wave from the fastener. Data associated with the incident ultrasonic wave and the reflected sonic wave is used to generate a modified value associated with the preload of the fastener, and the preload of the fastener is calculated based on a difference between the initial value and the modified value.

21 Claims, 7 Drawing Sheets

(56) References Cited

U.S. PATENT DOCUMENTS

| | | |
|---|---|---|
| 8,683,869 B2 | 4/2014 | Herley et al. |
| 2005/0027826 A1 | 2/2005 | Loda et al. |
| 2010/0050778 A1* | 3/2010 | Herley .................... G01L 5/246 73/761 |
| 2010/0316316 A1 | 12/2010 | Kamel |
| 2011/0113613 A1 | 5/2011 | Gamboa et al. |
| 2011/0181393 A1* | 7/2011 | Tillotson .................. H04Q 9/00 73/761 |
| 2012/0296578 A1 | 11/2012 | Redin |
| 2013/0030727 A1* | 1/2013 | Zalameda ............ G01N 29/045 702/56 |

\* cited by examiner

METHOD AND APPARATUS FOR MEASURING A PRELOAD OF A FASTENER

BACKGROUND

When assembling a bolted joint, the preload of each fastener in the joint is a factor associated with the integrity of the assembly.

Preloads cannot feasibly be measured with equipment conducive to manufacturing environments. Typically, mechanical torque tools are not suitable for measuring the preload of a loaded fastener.

Alternatively, the preload of a fastener may be measured utilizing a transducer integrated into the fastener. However, this approach may become objectionably expensive in joint assemblies utilizing significant numbers of fasteners.

SUMMARY

Accordingly, method and apparatus intended to address the above-identified concerns would find utility.

One example of the present disclosure relates to a method of measuring a preload of a fastener. The method includes establishing an initial value associated with an absence of the preload of the fastener; providing an adapter and a transducer rotatably coupled to the adapter; positioning the transducer in contact with the fastener; causing the transducer to direct an incident ultrasonic wave to the fastener; causing the transducer to receive a reflected ultrasonic wave from the fastener; using data associated with the incident ultrasonic wave and the reflected sonic wave to generate a modified value associated with the preload of the fastener; and calculating the preload of the fastener based on a difference between the initial value and the modified value.

One example of the present disclosure relates to a tool for measuring a preload of a fastener. The tool includes an adapter and a transducer coupled to the adapter and configured to be rotatable relative to the adapter about at least one axis.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Figure 1:
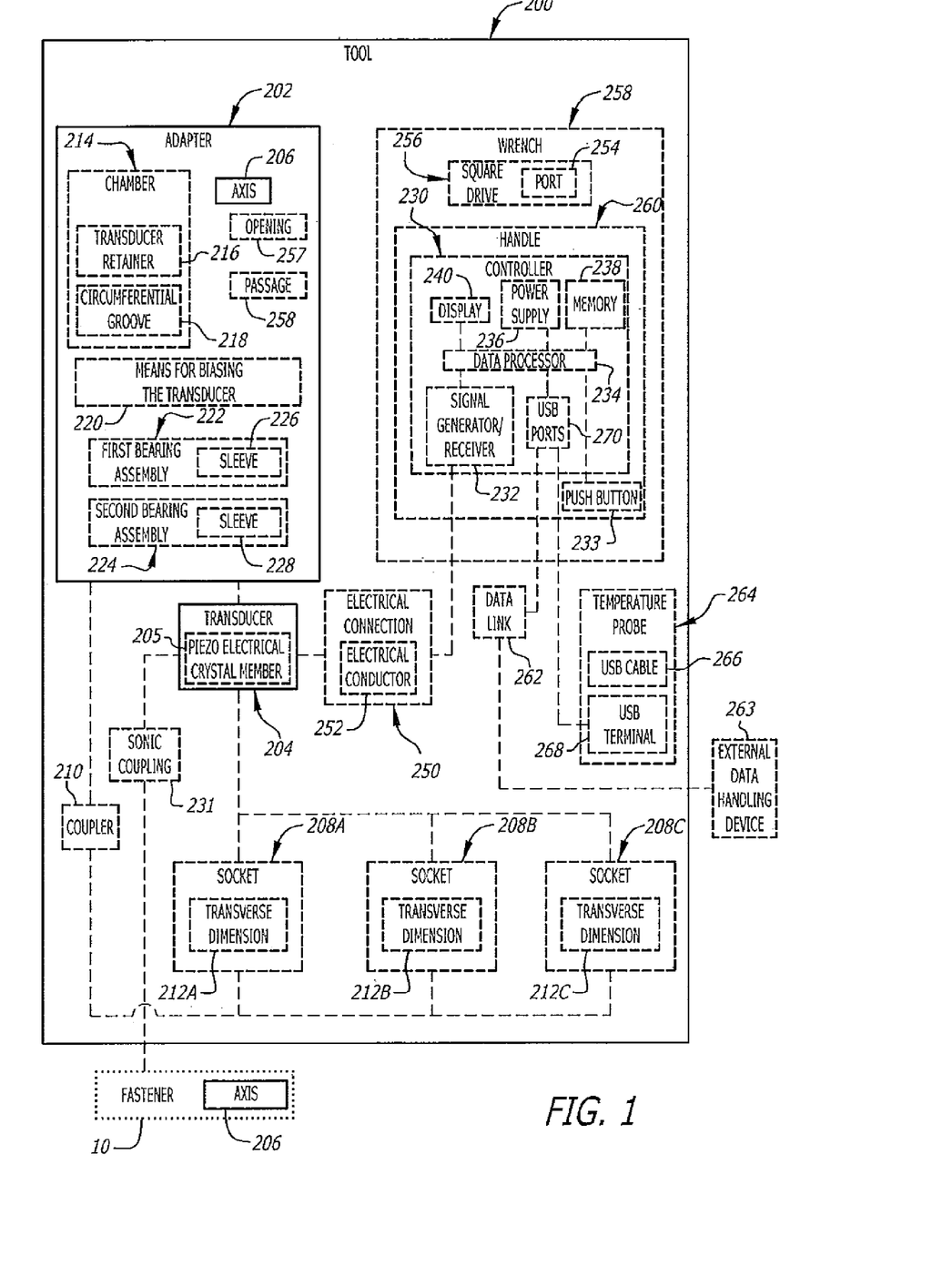
FIG. 1 is a block diagram of a tool for measuring a preload of a fastener, according to one aspect of the present disclosure.
Figure 2:
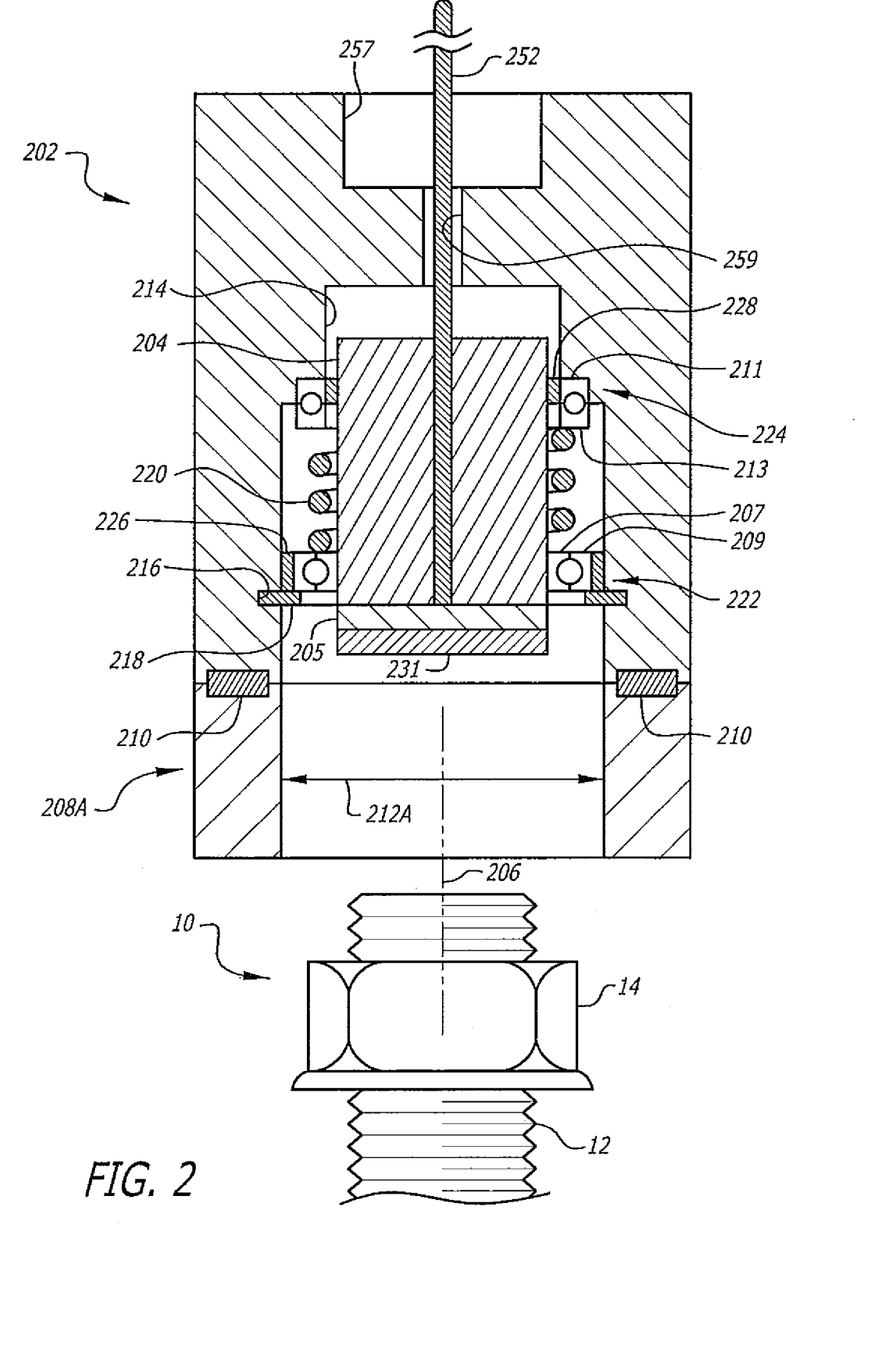
FIG. 2 is a schematic sectional view of an adapter and a socket of the tool of FIG. 1, according to one aspect of the disclosure.
Figure 3:
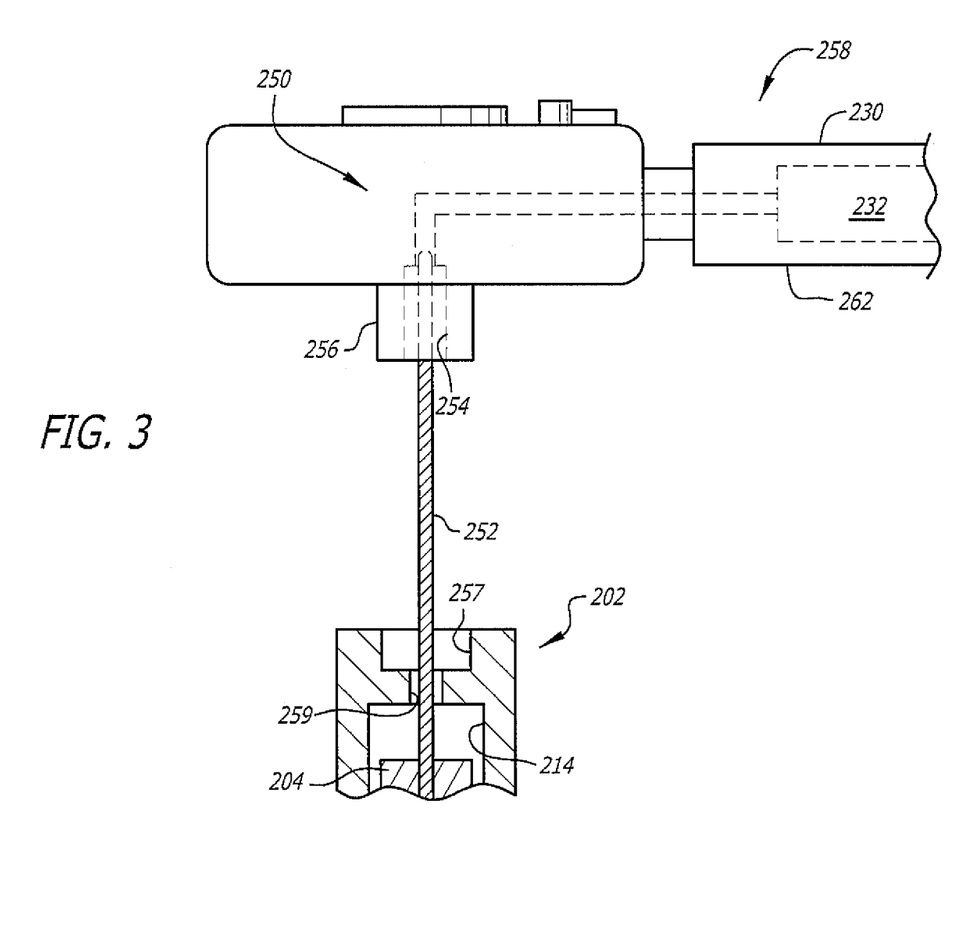
FIG. 3 is a schematic detail view of the wrench and the adapter shown in FIG. 1, according to one aspect of the disclosure.

Referring generally to FIGS. 1-3, and with particular reference to FIG. 1, one example of the present disclosure relates to a tool 200 for measuring a preload of a fastener 10 (FIG. 2). The tool 200 includes an adapter 202 and a transducer 204 coupled to the adapter 202. The transducer 204 is configured to be rotatable relative to the adapter 202 about at least one axis, e.g., an axis 206, which is generally the rotational axis of the adapter 202 and the fastener 10, as installed in a work piece (not shown). Those skilled in the art will appreciate that tools for driving fasteners generally have a clearance fit with the fasteners, resulting in an associated amount of play there-between. The fastener 10 may be a fastener including a plurality of parts, such as a threaded shank 12 and a nut 14 (e.g., FIG. 2). As used herein, preload is a load applied to a fastener purely as a result of being fastened and before any other load is applied thereto.

Referring, for example, to FIG. 2, the transducer 204 includes a first bearing assembly 222 having an inner race 207 fixed to the transducer 204 and an outer race 209, adjacent to the adapter 202. The first bearing assembly 222 is a radial bearing enabling rotation of the transducer 204 within a chamber 214 of the adapter 202. The adapter includes a second bearing assembly 224 having a first race 211 fixed to the adapter 202 and a second race 213 facing in the direction of axis 206. The first race 211 is secured to a feature formed in the wall of the chamber 214. The chamber 214 has an increased diameter below the first race 211, as depicted in FIG. 2, to avoid contact with the second race 213, so the bearing assembly 224 can rotate freely. The second bearing assembly 224 is a thrust bearing. The first and second bearing assemblies 222, 224 are separated from one another along the axis 206.

A first low-friction sleeve 226 is fixed to the outer race 209, and is interposed between the outer race 209 and the adapter 202. A second low-friction sleeve 228 is fixed to the first race 211, and is interposed between the first race 211 and the transducer 204 and is in sliding contact with the transducer 204. The first and second low-friction sleeves 226, 228 accommodate both rotation of the transducer 204 within the chamber 214 and also translation of the transducer 204 generally along the axis 206. The first and second low-friction sleeves 226, 228 may be made of polytetrafluoroethylene, for example.

The first bearing assembly 222 may be eliminated, if desired, and only the first low-friction sleeve 226, fixed to the transducer 204, may be used instead.

Rotation of the transducer 204 within the chamber 214 of the adapter 202 minimizes dynamic friction between the transducer 204 and the threaded shank 12 of the fastener 10. Such dynamic friction could produce an undesirable temperature increase when the transducer 204 is rotated relative to the threaded shank 12, thereby decreasing measurement accuracy, as will be further described hereinafter.

Referring particularly to FIG. 2, in one aspect of the disclosure, which may include at least a portion of the subject matter of any of the preceding and/or following examples and aspects, the tool 200 includes a sonic coupling 231 between the transducer 204 and the fastener 10. When the adapter 202 and the socket 208A are placed into contact with the fastener 10, the sonic coupling 231 serves as an interface for transmitting ultrasonic signals from the transducer 204 to the fastener 10. In one aspect of the disclosure, which may include at least a portion of the subject matter of any of the preceding and/or following examples and aspects, the sonic coupling 231 comprises a dry couplant. The dry couplant preserves integrity of transmitted ultrasonic signals while avoiding contamination of and loss of liquids from the tool-to-fastener interface, associated with the use of a liquid couplant. In one example, the dry couplant utilized may be DCMB 1.25:2, which is commercially available from Sigma Trandsucers of Kennewick, Wash.

In one aspect of the disclosure, which may include at least a portion of the subject matter of any of the preceding and/or following examples and aspects, the tool 200 also includes a socket 208A configured to be removably coupled with the adapter 202. The adapter 202 is configured to rotate the socket 208A when the adapter 202 is rotated, thereby engaging the fastener 10 to apply torque thereto. The tool 200 will be understood to include a coupler 210, configured to rotate the socket 208A when the adapter 202 is rotated. The coupler 210 may comprise a torque-transmitting coupling or interlock such as mating threads, a finger or a pin, a bayonet connection, or may take other forms. The coupler 210 may be part of either the adapter 202 or the socket 208A, or may be a part of both the adapter 202 and the socket 208A. The coupler 210 may include a detent device (not shown), such as a spring-loaded ball, to removably couple the socket 208A to the adapter 202. The ability to decouple the socket 208A from the adapter 202 allows a plurality of different sockets to be used with the tool 200, thereby accommodating more than one size of fastener, while requiring only one transducer 204 regardless of the number of fastener sizes.

Figure 2A:
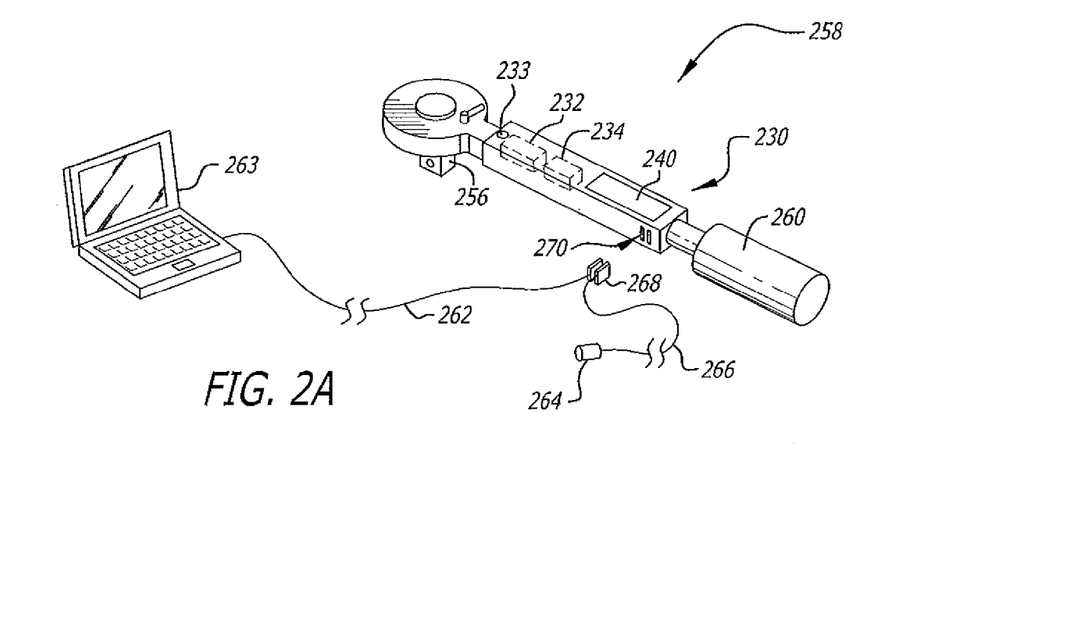
FIG. 2A is a schematic perspective view of a wrench, shown in FIG. 1, which may be used with the adapter of FIG. 2.
Figure 2B:
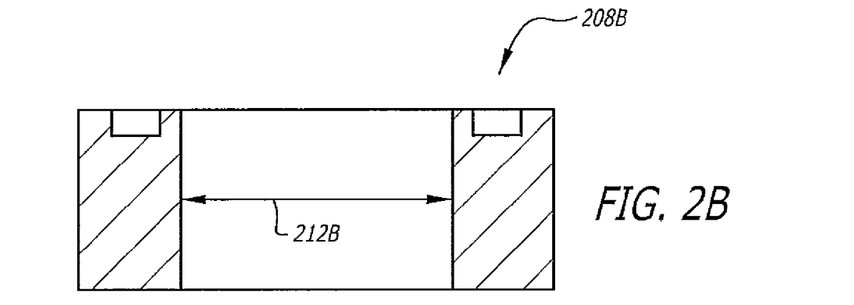
FIG. 2B is a schematic sectional view of the socket of the tool of FIG. 1 according to another aspect of the disclosure.
Figure 2C:
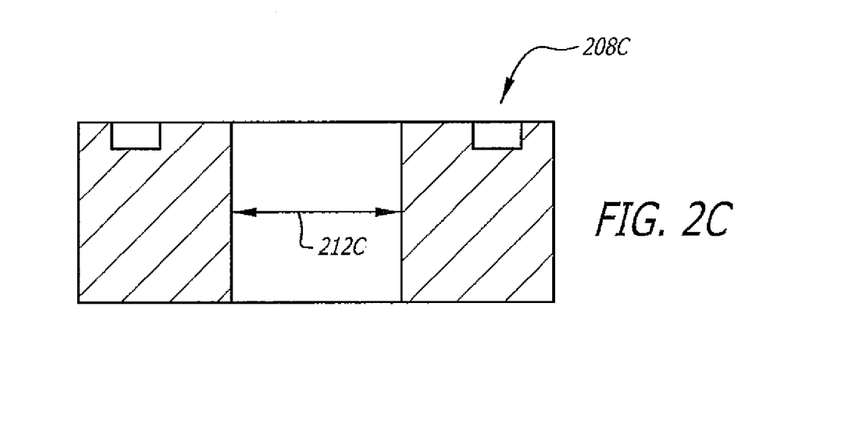
FIG. 2C is a schematic sectional view of the socket of the tool of FIG. 1 according to yet another aspect of the disclosure.

Referring also to FIGS. 2B and 2C, in one aspect of the disclosure, which may include at least a portion of the subject matter of any of the preceding and/or following examples and aspects, the tool 200 may include a plurality of sockets, such as sockets 208A, 208B, and 208C. Each one of the plurality of sockets, e.g., the sockets 208A, 208B, and 208C, has a respective transverse dimension, e.g., 212A, 212B, and 212C, different from a corresponding transverse dimension of another one of the plurality of sockets. Each of the sockets, e.g., 208A, 208B, and 208C, interacts with the adapter 202 in the same way, but is intended for use with fasteners (such as the fastener 10) of different nominal fastener sizes.

Again referring to FIG. 2, in one aspect of the disclosure, which may include at least a portion of the subject matter of any of the preceding and/or following examples and aspects, the adapter 202 is configured to enable the transducer 204 to be biased against the fastener 10. As used herein, "to bias" means to apply a steady force. Biasing the transducer 204 against the fastener 10 promotes effective contact and signal transmission therebetween.

Effective contact and communication between the transducer 204 and the fastener 10 are further promoted by additional features of the tool 200, as will be described hereinafter. In one aspect of the disclosure, which may include at least a portion of the subject matter of any of the preceding and/or following examples and aspects, the transducer 204 is configured to translate relative to the adapter 202 in a direction substantially parallel to at least one axis, such as the axis 206. Translation enables the transducer 204 to move into necessary and effective contact with the fastener. In one aspect of the disclosure, which may include at least a portion of the subject matter of any of the preceding and/or following examples and aspects, the adapter 202 also includes means 220 for biasing the transducer 204 toward the fastener 10, to promote effective transmission of signals between the transducer 204 and the fastener 10. In the example of FIG. 2, the means 220 may include a spring entrapped between the first bearing assembly 222 and the second bearing assembly 224. The spring may be a coil spring, a leaf spring, a conical or undulating washer, such as a Belleville washer, or still another mechanical, metallic, or resilient elastomeric spring arrangement. Alternatively, instead of or in addition to the spring, the means 220 may include a gas spring or a magnetic repulsion arrangement. The means 220 may include an active or powered element, such as a solenoid device or electromagnetic field, pressurized fluid, or a finger, lever, gear, wedge, or other mechanical element moved under power to bias the transducer 204 toward the fastener 10.

In one aspect of the disclosure, which may include at least a portion of the subject matter of any of the preceding and/or following examples and aspects, the adapter 202 comprises the chamber 214 and a transducer retainer 218 in the chamber 214. The transducer retainer 218 may include a circlip, configured to be received within and removably occupy an internal circumferential groove 216 in the chamber 214. The transducer retainer 218 is located in the chamber 214 such that translation of the transducer 204 within the chamber 214 is enabled within a limited range, thereby maintaining effective contact with the fastener 10, for passing signals. Furthermore, inadvertent loss of the transducer 204 from the adapter 202 is precluded by the transducer retainer 218, for example, when the tool 200 is removed from the fastener 10. In one aspect, the transducer retainer 218 is removable from the chamber 214, for example, to allow removal of the transducer 204 from the chamber for service or replacement.

The second bearing assembly 224 provides a rotatable seat to allow the means 220 (e.g., the spring) and the adapter 202 to rotate relative to each other. The spring rests against and may be immobilized relative to the inner race 207 of the bearing assembly 222 and the second race 213 of the second bearing assembly 224. As a consequence, the spring does not substantially rotate relative to the transducer 204, which remains stationary with respect to the shank 12 of the fastener 14 due to the biasing force of the means 220 and the static friction provided by the sonic coupling 231, when the adapter 202 and the socket 208A rotate the nut 14. The biasing force applied by the means 220 also enhances signal transmission between the transducer 204 and the shank 12 of the fastener 10.

Referring to FIGS. 1 and 2A, in one aspect of the disclosure, which may include at least a portion of the subject matter of any of the preceding and/or following examples and aspects, the tool 200 also includes a controller 230 configured to be communicatively coupled with the transducer 204. The controller 230 may be incorporated into a wrench 258, described in further detail below. The controller 230 may include an input device 233 for generating operating signals to be transmitted to the fastener 10. Where it is desired to provide operating signals manually, the input device 233 may include a pushbutton accessible at the exterior of the controller 230 for controlling operation of the tool. In one aspect of the disclosure, which may include at least a portion of the subject matter of any of the preceding and/or following examples and aspects, the controller 230 includes a signal generator-receiver 232, configured to exchange electrical signals with the transducer 204, and a data processor 234, configured to communicate with the signal generator-receiver 232. The data processor 234 is configured to convert electrical signals received by the signal generator-receiver 232 from the transducer 204 into values indicative of the preload of the fastener 10. As illustrated schematically in FIG. 1, the data processor 234 includes all components necessary for operability, such as a power supply 236 and a memory 238, as well as any necessary software. Similarly, all data processing and exchanging devices recited herein will be understood to be provided with necessary signal and power circuitry, including insulation, switching, and transducers, among other necessities not explicitly described.

In one aspect of the disclosure, which may include at least a portion of the subject matter of any of the preceding and/or following examples and aspects, the controller 230 includes a display 240 configured to communicate with the data processor 234, for displaying calculated preload values.

Referring generally to FIGS. 1-3 and in particular to FIG. 2, in one aspect of the disclosure, which may include at least a portion of the subject matter of any of the preceding and/or following examples and aspects, the tool 200 also includes an electrical connection 250 between the signal generator-receiver 232 and the transducer 204. As used herein, "electrical connection" explicitly connotes circuitry which conducts voltage and current, such as metallic conductors, for example. The conductors need not be a single, continuous element, but may comprise plural elements in contact with each other. In one aspect of the disclosure, which may include at least a portion of the subject matter of any of the preceding and/or following examples and aspects, the electrical connection 250 includes an electrical conductor 252, such as a pin, coupled to the transducer 204. A portion of the electrical conductor 252 is external to the adapter 202, so that it can establish electrical contact with the signal generator/receiver 232.

Turning to FIG. 3, in one aspect of the disclosure, which may include at least a portion of the subject matter of any of the preceding and/or following examples and aspects, the tool 200 includes the wrench 258 configured to be electrically coupled with the electrical connection 250. In one aspect of the disclosure, which may include at least a portion of the subject matter of any of the preceding and/or following examples and aspects, the wrench 258 is configured to apply a torque to the adapter 202, using a square drive 256, for example. The wrench 258 may include an indicator (not shown), configured to indicate torque values of applied preload or torque, and may include an adjustable or non-adjustable torque-limiting feature. The square drive 256 may releasably engage a cooperating drive opening 257 in the adapter 202. The opening 257 communicates with a passage 259 extending to the chamber 214, so that the pin or electrical conductor 252 of transducer 204 may project externally from the adapter 202. The pin or electrical conductor 252 is received within a port 254 in the drive 256 of the wrench 258. Electrical continuity between the electrical conductor 252 and the port 254 may be maintained by slip rings (not shown).

Referring to FIG. 2A, in one aspect of the disclosure, which may include at least a portion of the subject matter of any of the preceding and/or following examples and aspects, as previously described, the wrench 258 includes the controller 230, with the signal generator/receiver 232, the data processor 234, the display 240, and the power supply contained within a handle 260 of the wrench 258. The wrench 258 thereby provides a self-contained tool which both applies torque and also measures preload.

Referring to FIGS. 1 and 2A, in one aspect of the disclosure, which may include at least a portion of the subject matter of any of the preceding and/or following examples and aspects, the tool 200 also includes a data link 262, configured to exchange data between the controller 230 and an external data-handling device 263. The data link 262 may include a data cable, such as a USB cable, a wireless link, or any modality which supports transfer of data. The external data-handling device 263 may be a personal computer, a tablet, or a personal communications device such as a smart phone, among others. The data link 262 may be utilized, for example, to transmit data relating to initial length of the fastener 10 and preload data for storage, display, and other uses at the external data-handling device 263.

Again referring to FIG. 2A, in one aspect of the disclosure, which may include at least a portion of the subject matter of any of the preceding and/or following examples and aspects, the tool 200 also includes a temperature probe 264 communicatively coupled to the controller 230. The temperature probe 264 may include a data cable 266 having a USB terminal 268 compatible with USB ports 270 in the handle 260 of the wrench 258. The temperature probe 264 enables adjustments in calculating fastener preload, based on the actual temperature of the fastener 10.

Figure 4:
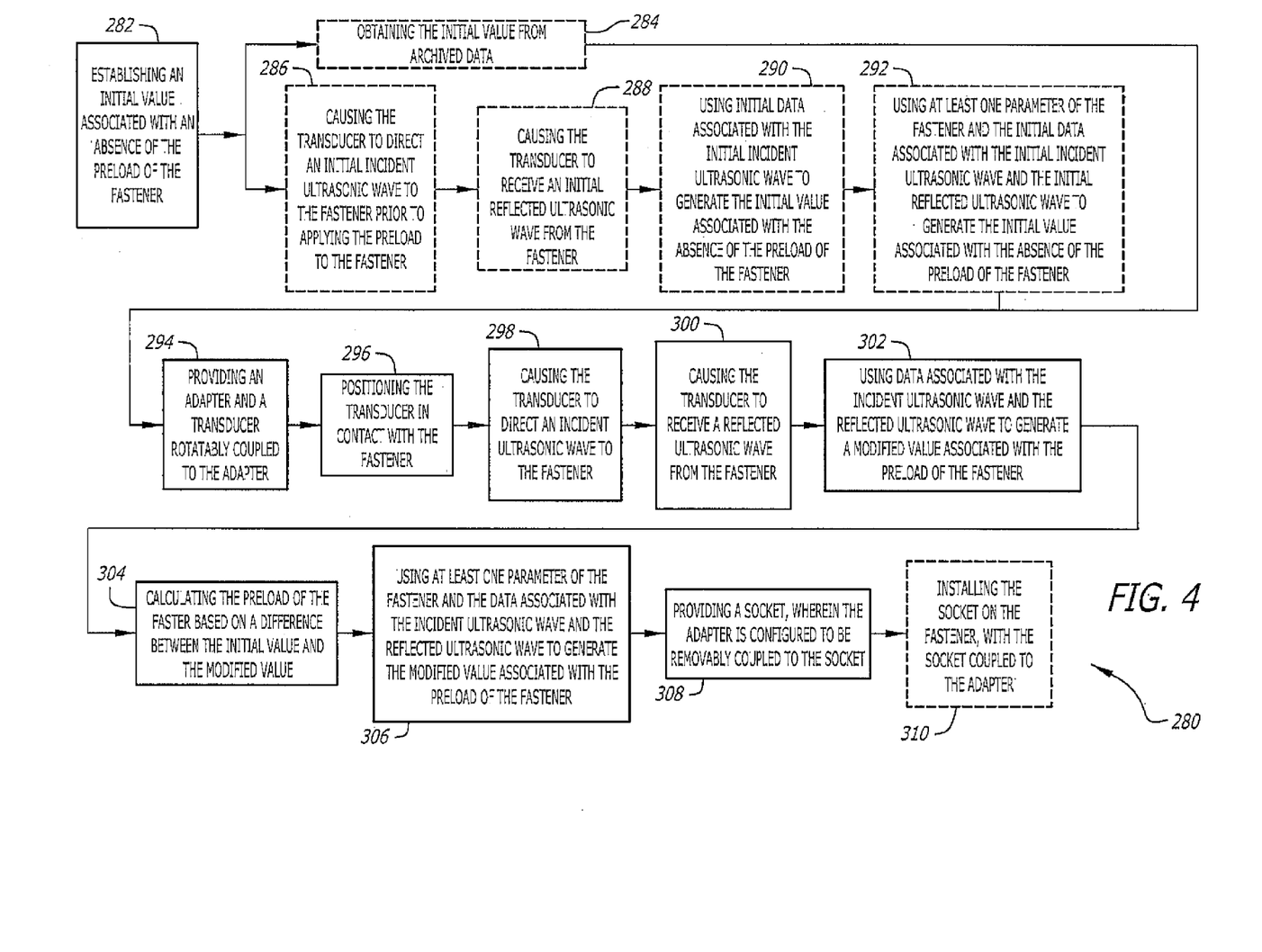
FIG. 4 is a block diagram of a method of measuring a preload of a fastener, according to one aspect of the disclosure.

Referring primarily to FIG. 4, one example of the present disclosure relates to a method 280 of measuring a preload of the fastener 10. The method 280 includes establishing an initial value associated with an absence of the preload of the fastener 10 (block 282), providing an adapter 202 and a transducer 204 rotatably coupled to the adapter 202 (block 294), positioning the transducer 204 in contact with the fastener 10 (block 296), causing the transducer 204 to direct an incident ultrasonic wave to the fastener 10 (block 298), causing the transducer 204 to receive a reflected ultrasonic wave from the fastener 10 (block 300), using data associated with the incident ultrasonic wave and the reflected ultrasonic wave to generate a modified value associated with the preload of the fastener 10 (block 302), and calculating the preload of the fastener 10 based on a difference between the initial value and the modified value (block 304).

The initial value associated with the absence of the preload of the fastener 10 may be a temporal value related to the time of travel of an ultrasonic wave through the fastener 10, measured prior to application of torque to the fastener 10. The transducer 204 is configured to convert electrical signals to ultrasonic waves and vice versa. As shown, e.g., in FIG. 2, the transducer 204 may include a piezoelectric crystal member 205, which oscillates at ultrasonic frequencies when an alternating current is applied thereto. Conversely, the piezoelectric crystal member 205 generates a voltage when forces, such as ultrasonic waves, are applied thereto.

Responsive to applied currents, ultrasonic waves are transmitted from the transducer 204 through the fastener 10, reflect from the distal end of the fastener 10, and return to the transducer 204. The transducer 204 then converts returned ultrasonic waves to electrical signals, which are then transmitted to the data processor 234. A sensor in the controller 230 senses the time interval elapsing between generating the initial electrical signal, and reception of a corresponding electrical signal derived from the reflected ultrasonic wave. The elapsed time is indicative of the length of the fastener 10. Comparison of data corresponding to signals associated with the length of the fastener 10 without a preload with data corresponding to signals associated with the length of the fastener 10 with the preload enables calculation of the actual preload.

Referring also to FIG. 2A, prior to applying a torque using the wrench 258, the pushbutton 233 is depressed to initialize the data processor 234, for example, by deleting obsolescent data and setting initial values to zero in preparation for measuring the preload. An initial electrical signal and associated ultrasonic wave are generated, determining the initial length of the fastener 10. The data processor 234 and its software may be arranged to initiate a continuing series of electrical signals which are converted to ultrasonic waves by the transducer 204. The latest returned signal at any point in the process is processed to calculate a preload value, which is then represented on the display 240. A continuously updated display of preload is thus available to the user of the tool 200. Therefore, the user of the tool 200 may concentrate on applying torque to the fastener 10, and need not be distracted by manually entering a command into the tool 200 in order to receive preload feedback data. Alternatively, the user may enter a preload value into the tool 200. When the preload value is attained after applying additional torque using the wrench 258, an indicator on the wrench 258 activates. Illustratively, such indicator may include an advisory lamp (not shown) which may illuminate, or alternatively, a value may be shown on the display 240.

Referring again to FIG. 4, in one aspect of the disclosure, which may include at least a portion of the subject matter of any of the preceding and/or following examples and aspects, the method 280 also includes using at least one parameter of the fastener 10 and the data associated with the incident ultrasonic wave and the reflected ultrasonic wave to generate the modified value associated with the preload of the fastener 10 (block 306). The parameter of the fastener 10 may be the particular alloy from which the fastener 10 is fabricated, the temperature of the fastener 10, and other characteristics which may influence the time of travel of the ultrasonic wave. Considering the parameter or parameters together with the time of travel improves accuracy of the calculated preload.

In one aspect of the disclosure, which may include at least a portion of the subject matter of any of the preceding and/or following examples and aspects, the method 280 includes providing the socket 208A, wherein the adapter 202 is configured to be removably coupled to the socket 208A (block 308), and installing the socket 208A on the fastener 10, with the socket 208A coupled to the adapter 202 (block 310). Without the socket 208A, the method is limited to generating and acquiring temporal data; with the socket 208A, the method 280 may further include applying a torque to the fastener 10.

In one aspect of the disclosure, which may include at least a portion of the subject matter of any of the preceding and/or following examples and aspects, establishing the initial value includes obtaining the initial value from archived data (block 284). Archived data will be understood to encompass predetermined characteristics, such as manufacturing specifications which apply to the fastener 10. For example, the initial value may be based on stored initial fastener lengths. Archived data may be in the form of a look-up table. Use of archived data enables verifying preload of previously installed fasteners.

In one aspect of the disclosure, which may include at least a portion of the subject matter of any of the preceding and/or following examples and aspects, the incident ultrasonic wave is a subsequent incident ultrasonic wave, the reflected ultrasonic wave is a subsequent reflected ultrasonic wave, and the data is subsequent data. Establishing the initial value includes causing the transducer 204 to direct an initial incident ultrasonic wave to the fastener prior to applying the preload to the fastener 10 (block 286), causing the transducer 204 to receive an initial reflected ultrasonic wave from the fastener 10 (block 288), and using initial, data associated with the initial incident ultrasonic wave and the initial reflected Ultrasonic wave to generate the initial value associated with the absence of the preload of the fastener (block 290). The initial value obtained in this manner may then be compared with the modified value to calculate the preload of the fastener based on the difference between the two.

In one aspect of the disclosure, which may include at least a portion of the subject matter of any of the preceding and/or following examples and aspects, the method 280 includes using at least one parameter of the fastener 10 and the initial data associated with the initial incident ultrasonic wave and the initial reflected ultrasonic wave, to generate the initial value associated with the absence of the preload of the fastener 10 (block 292). The parameter of the fastener 10 may be one or more of the physical characteristics described above. Using both the parameter of the fastener 10 and the initial data improves accuracy of the initial value, where the latter is obtained by actual measurement.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 5:
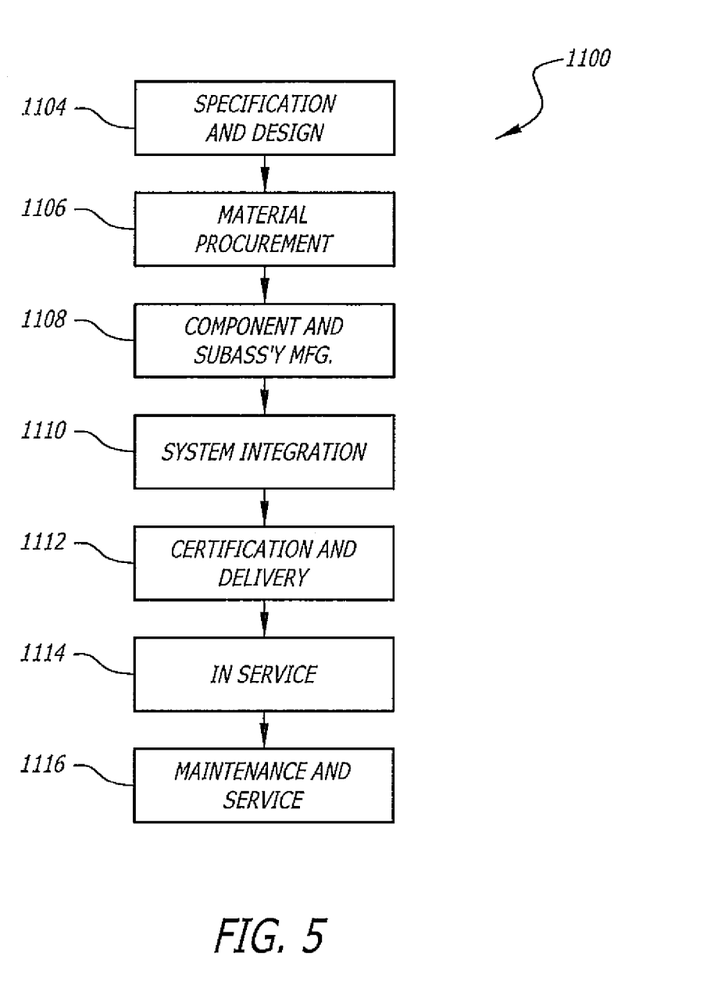
FIG. 5 is a flow diagram of aircraft production and service methodology.
Figure 6:
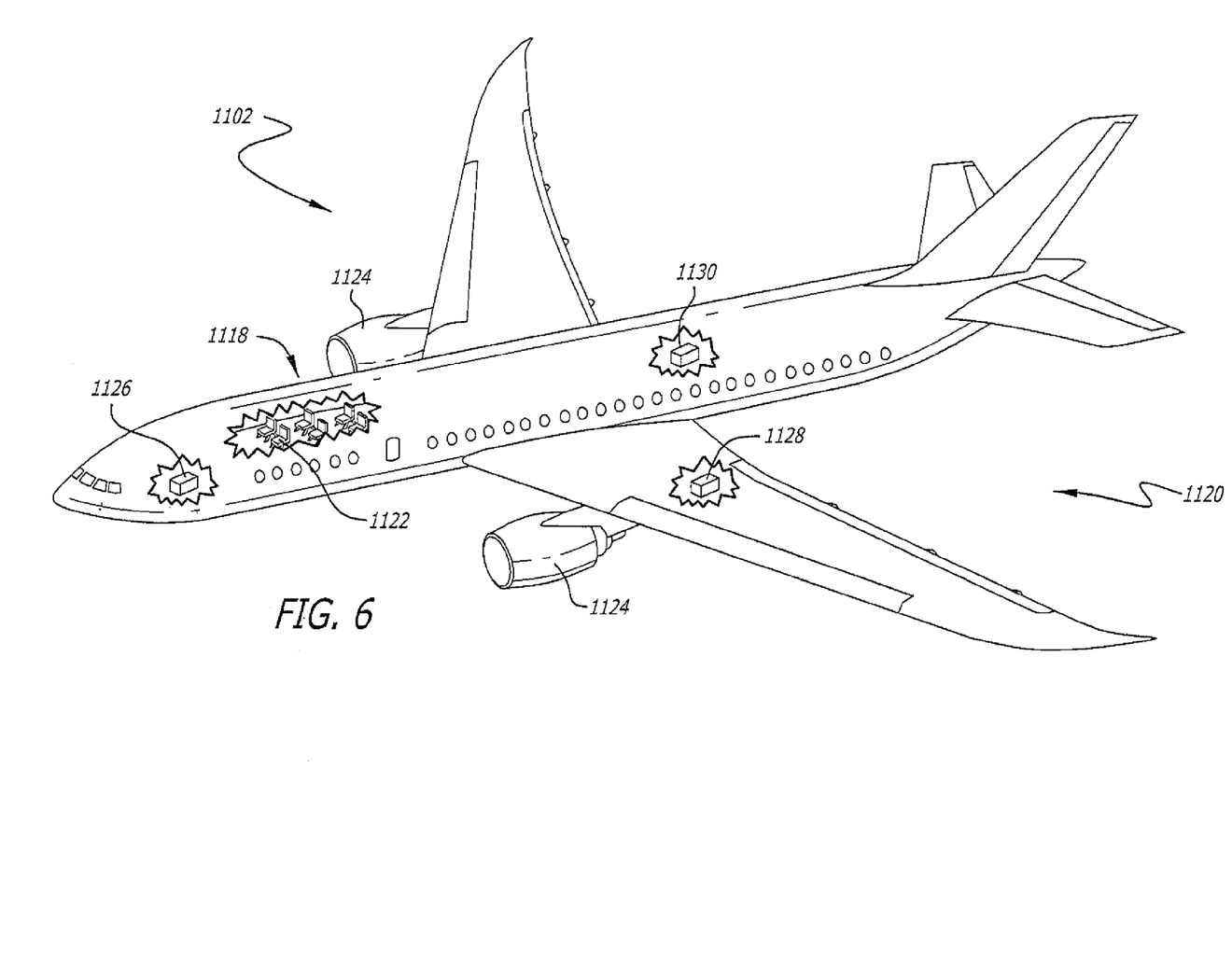
FIG. 6 is a schematic illustration of an aircraft.

Examples of the disclosure may be described in the context of an aircraft manufacturing and service method 1100 as shown in FIG. 5 and an aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, the aircraft 1102 produced by the illustrative method 100 may include an airframe 1118 with a plurality of high-level systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A tool for measuring a preload of a fastener, the tool configured to be attached to a wrench, comprising a handle, the tool comprising:
   a socket;
   an adapter, detachably and non-rotatably coupled to the socket,
      wherein the adapter is configured to be removably attached to the wrench;
   a transducer, coupled to the adapter,
      wherein the transducer is configured to be translatable relative to the adapter and rotatable relative to the adapter and to the handle of the wrench about at least one axis;
   a bearing assembly, disposed within a chamber of the adapter,
      wherein the bearing assembly rotatably couples the transducer to the adapter; and
   a sleeve, disposed between the bearing assembly and the adapter within the chamber of the adapter,
      wherein the bearing assembly slidably couples the transducer to the adapter.

2. The tool of claim 1, wherein the adapter is configured to enable the transducer to be biased against the fastener.

3. The tool of claim 2, wherein the transducer is configured to be translatable relative to the adapter in a direction substantially parallel to the at least one axis.

4. The tool of claim 1, wherein the adapter further comprises means for biasing the transducer toward the fastener.

5. The tool of claim 4, wherein the adapter comprises a chamber and a transducer retainer, disposed in the chamber.

6. The tool of claim 1, wherein the socket is one of a plurality of sockets, wherein each one of the plurality of sockets has a transverse dimension different from a corresponding transverse dimension of another one of the plurality of sockets.

7. The tool of claim 1, further comprising a controller configured to be communicatively coupled with the transducer.

8. The tool of claim 7, wherein the controller further comprises:
   a signal generator-receiver configured to exchange electrical signals with the transducer; and
   a data processor configured to communicate with the signal generator-receiver, wherein the data processor is configured to convert electrical signals received by the signal generator-receiver from the transducer into values indicative of the preload of the fastener.

9. The tool of claim 8, further comprising an electrical connection between the signal generator-receiver and the transducer.

10. The tool of claim 9, wherein the electrical connection comprises an electrical conductor coupled to the transducer, wherein a portion of the electrical conductor is external to the adapter.

11. The tool of claim 10, wherein the tool further includes a wrench configured to be electrically coupled with the electrical connection.

12. The tool of claim 7, further comprising a temperature probe communicatively coupled to the controller.

13. The tool of claim 1, further comprising a sonic coupling between the transducer and the fastener.

14. The tool of claim 8, wherein the controller further comprises a display configured to communicate with the data processor.

15. The tool of claim 8, wherein the wrench is configured to apply a torque to the adapter.

16. The tool of claim 15, wherein the wrench includes the controller.

17. The tool of claim 8, further comprising a data link configured to exchange data between the controller and an external data-handling device.

18. The tool of claim 13, wherein the sonic coupling comprises a dry couplant.

19. The tool of claim 1,
wherein, when the adapter is attached to the wrench and when the transducer is biased against a threaded shank of the fastener,
the adapter and the socket are rotated relative to the threaded shank about at least the one axis responsive to the handle of the wrench being rotated relative to the threaded shank,
the transducer is not rotated relative to the threaded shank responsive to the handle of the wrench being rotated relative to the threaded shank,
the handle of the wrench together with the adapter are rotated relative to the transducer responsive to the handle of the wrench being rotated relative to the threaded shank, and
the socket is configured to rotate a nut relative to the threaded shank responsive to the handle of the wrench being rotated relative to the threaded shank.

20. The tool of claim 8, further comprising the wrench configured to apply a torque to the adapter.

21. The tool of claim 8, further comprising a data link configured to exchange data between the controller and an external data-handling device.

\* \* \* \* \*